(12) United States Patent
Ishii et al.

(10) Patent No.: US 12,436,108 B2
(45) Date of Patent: Oct. 7, 2025

(54) METHOD FOR ILLUMINATION AND SYSTEM FOR DETERMINING SPECTRAL DISTRIBUTION OF LIGHT FOR ILLUMINATION

(71) Applicant: NALUX CO., LTD., Osaka (JP)

(72) Inventors: Michitomo Ishii, Osaka (JP); Daisuke Sato, Osaka (JP)

(73) Assignee: NALUX CO., LTD., Osaka (JP)

( * ) Notice: Subject to any disclaimer, the term of this patent is extended or adjusted under 35 U.S.C. 154(b) by 483 days.

(21) Appl. No.: 17/943,902

(22) Filed: Sep. 13, 2022

(65) Prior Publication Data

US 2023/0003662 A1    Jan. 5, 2023

Related U.S. Application Data

(63) Continuation of application No. PCT/JP2021/010532, filed on Mar. 16, 2021.

(30) Foreign Application Priority Data

Mar. 23, 2020 (JP) ................................. 2020-050917

(51) Int. Cl.
*H05B 47/105* (2020.01)
*G01J 3/28* (2006.01)
(Continued)

(52) U.S. Cl.
CPC ............ *G01N 21/8806* (2013.01); *G01J 3/28* (2013.01); *H05B 47/105* (2020.01);
(Continued)

(58) Field of Classification Search
None
See application file for complete search history.

(56) References Cited

U.S. PATENT DOCUMENTS

| 5,803,579 A | 9/1998 | Trunbull et al. |
| 6,132,072 A | 10/2000 | Turnbull et al. |

(Continued)

FOREIGN PATENT DOCUMENTS

| DE | 11 2014 005 132 T5 | 8/2016 |
| JP | 05-36380 A | 2/1993 |

(Continued)

OTHER PUBLICATIONS

International Search Report and Written Opinion dated Jun. 1, 2021 corresponding to International Patent Application No. PCT/JP2021/010532, with partial English translation thereof.

(Continued)

*Primary Examiner* — Rufus L Phillips
(74) *Attorney, Agent, or Firm* — SQUIRE PATTON BOGGS (US) LLP

(57) ABSTRACT

A method for illumination of an object to be observed to be observed and the background, the method comprising the steps of: obtaining a relationship between wavelength and spectral radiance of the object while the object and the background are illuminated by a first light source that emits light that has a continuous spectrum in the wavelength range from 380 nanometers and 780 nanometers, and determining a value of representative wavelength that corresponds to a maximum value of the spectral radiance of the object plotted against wavelength or values of representative wavelength that correspond to maximum values of the spectral radiance of the object plotted against wavelength; determining a value or values of comparative wavelength; and illuminating the object and the background with light of the value or values of representative wavelength and light of the value or values of comparative wavelength.

6 Claims, 20 Drawing Sheets

(51) Int. Cl.
*G01N 21/88* (2006.01)
*G01J 3/12* (2006.01)

(52) U.S. Cl.
CPC .......... *G01J 2003/1213* (2013.01); *G01J 2003/1282* (2013.01); *G01J 2003/283* (2013.01); *G01N 2021/8835* (2013.01)

(56) References Cited

U.S. PATENT DOCUMENTS

| | | | |
|---|---|---|---|
| 6,523,976 | B1 | 2/2003 | Turnbull et al. |
| 7,524,097 | B2 | 4/2009 | Turnbull et al. |
| 2007/0216704 | A1* | 9/2007 | Roberts .................. H05B 45/44 345/597 |
| 2013/0258366 | A1* | 10/2013 | Miyazaki ............... G01N 21/89 358/1.9 |
| 2014/0252967 | A1* | 9/2014 | van de Ven ............ H05B 45/48 315/193 |
| 2015/0334807 | A1* | 11/2015 | Gordin .................. H05B 47/11 315/158 |
| 2016/0227626 | A1 | 8/2016 | Hung |

FOREIGN PATENT DOCUMENTS

| | | |
|---|---|---|
| JP | 2006-202494 A | 8/2006 |
| JP | 2013-246961 A | 12/2013 |
| JP | 2014-135195 A | 7/2014 |
| WO | 97/48134 A1 | 12/1997 |
| WO | 2015/085050 A1 | 6/2015 |

OTHER PUBLICATIONS

First Office Action dated Jul. 1, 2020 corresponding to Japanese Patent Application No. 2020-050917.
Second Office Action dated Oct. 20, 2020 corresponding to Japanese Patent Application No. 2020-050917.
Office Action dated May 22, 2024 corresponding to German Patent Application No. 11 2021 001 802.7.

* cited by examiner

METHOD FOR ILLUMINATION AND SYSTEM FOR DETERMINING SPECTRAL DISTRIBUTION OF LIGHT FOR ILLUMINATION

CROSS REFERENCE TO RELATED APPLICATION

This is a Continuation of International Patent Application No. PCT/JP2021/010532 filed Mar. 16, 2021, which designates the U.S., and which claims priority from Japanese Patent Application No. 2020-050917, dated Mar. 23, 2020. The contents of these applications are hereby incorporated by reference.

TECHNICAL FIELD

The present invention relates to a method for illumination and a system for determining a spectral distribution of light for illumination used for increasing the visibility of an object to be observed.

BACKGROUND ART

In several cases of diagnoses in the medical field, inspections of products in the manufacturing industry and the like, objects are observed while illuminated with light for illumination. In such cases, it is preferable to select light for illumination that increases the visibility of objects to be observed. Conventionally individual observers have selected light for illumination that increases the visibility of objects to be observed based on their personal views after much trial and error.

Patent document 1 discloses a method in which light for illumination is efficiently used by controlling a spectral distribution of the light for illumination and the spectral reflectance of color material, and an illuminating system using the method. Patent document 1, however, does not disclose how to determine light for illumination that increases the visibility of objects to be observed.

Thus, a method for illumination and a system for determining a spectral distribution of light for illumination that increase the visibility of objects to be observed without the help of individual observers' personal views and trial and error have not been developed up to now.

PRIOR ART DOCUMENT

Patent Document

Patent document 1: JP2014135195A

Accordingly, there is a need for a method for illumination and a system for determining a spectral distribution of light for illumination that increase the visibility of objects to be observed without the help of individual observers' personal views and trial and error. The object of the present invention is to provide a method for illumination and a system for determining a spectral distribution of light for illumination that increase the visibility of objects to be observed without the help of individual observers' personal views and trial and error.

SUMMARY OF THE INVENTION

A method for illumination according to a first aspect of the present invention is a method for illumination of an object to be observed and the background. The method includes the steps of determining a color matching function and obtaining an xy chromaticity diagram using the color matching function; obtaining a relationship between wavelength and spectral radiance of the object to be observed while the object to be observed and the background are illuminated by a first light source that emits light that has an average color rendering index of 40 or greater, a color temperature in the range from 3000 K to 10000 K and a continuous spectrum in the wavelength range from 380 nanometers and 780 nanometers, and determining a value of representative wavelength that corresponds to a maximum value of the spectral radiance of the object to be observed plotted against wavelength or values of representative wavelength that correspond to maximum values of the spectral radiance of the object to be observed plotted against wavelength; determining a value of comparative wavelength for the value or values of representative wavelength using the value or values of representative wavelength and the xy chromaticity diagram so as to increase a contrast ratio between the object to be observed and the background; and illuminating the object to be observed and the background with light of the value or values of representative wavelength and light of the value of comparative wavelength.

In the method for illumination according to the present aspect, the value of comparative wavelength for the value or values of representative wavelength is determined using the value or values of representative wavelength and the xy chromaticity diagram so as to increase a contrast ratio between the object to be observed and the background. Accordingly, the visibility of objects to be observed can be increased without the help of individual observers' personal views and trial and error.

In the method for illumination according to a first embodiment of the first aspect of the present invention, a disabled zone of comparative wavelength is determined before the value of comparative wavelength is obtained, and the value of comparative wavelength is determined such that the value is outside the disabled zone.

According to the method for illumination according to the present embodiment, observers' tastes of color can be reflected in an image by determining the disabled zone of comparative wavelength.

In the method for illumination according to a second embodiment of the first aspect of the present invention, in the step of determining the value of comparative wavelength, a single value of representative wavelength is used, and the wavelength closest to the complementary wavelength of the single value of representative wavelength in the xy chromaticity diagram is selected as the value of comparative wavelength.

According to the method for illumination according to the present embodiment, the contrast ratio between the object to be observed and the background can be increased by selecting the complementary wavelength of the value of representative wavelength in the xy chromaticity diagram as the value of comparative wavelength.

In the method for illumination according to a third embodiment of the first aspect of the present invention, in the step of determining the value of comparative wavelength, plural values of representative wavelength are used, and the wavelength corresponding to the point at which a sum of color differences from the plural points representing the plural values of representative wavelength is maximized in the xy chromaticity diagram, is selected as the value of comparative wavelength.

According to the method for illumination according to the present embodiment, the contrast ratio between the object to be observed and the background can be increased by selecting the wavelength corresponding to the point at which a sum of color differences from the plural points representing the plural values of representative wavelength is maximized in the xy chromaticity diagram, as the value of comparative wavelength.

In the method for illumination according to a fourth embodiment of the first aspect of the present invention, in the step of determining the value of comparative wavelength, plural values of representative wavelength are used, and in the xy chromaticity diagram, the wavelength closest to the complementary wavelength of the average of the plural values of representative wavelength in the xy chromaticity diagram is selected as the value of comparative wavelength.

According to the method for illumination according to the present embodiment, the contrast ratio between the object to be observed and the background can be increased by selecting, in the xy chromaticity diagram, the wavelength closest to the complementary wavelength of the average of the plural values of representative wavelength is selected as the value of comparative wavelength.

A method for illumination according to a second aspect of the present invention is a method for illumination of an object to be observed and the background. The method includes the steps of obtaining a relationship between wavelength and spectral radiance of the object to be observed while the object to be observed and the background are illuminated by a first light source that emits light that has an average color rendering index of 40 or greater, a color temperature in the range from 3000 K to 10000 K and a continuous spectrum in the wavelength range from 380 nanometers and 780 nanometers, and determining a value of representative wavelength that corresponds to a maximum value of the spectral radiance of the object to be observed plotted against wavelength or values of representative wavelength that correspond to maximum values of the spectral radiance of the object to be observed plotted against wavelength; obtaining a relationship between wavelength and spectral radiance of the background while the object to be observed and the background are illuminated by the first light source, and determining a value of comparative wavelength that corresponds to a maximum value or a minimum value of the spectral radiance of the background plotted against wavelength or values of comparative wavelength that correspond to maximum values or minimum values of the spectral radiance of the background plotted against wavelength; and illuminating the object to be observed and the background with light of the value or values of representative wavelength and light of the value or values of representative wavelength.

In the method for illumination according to the present aspect, the relationship between wavelength and spectral radiance of the object to be observed is obtained while the object to be observed and the background are illuminated by the first light source, the value of representative wavelength that corresponds to a maximum value of the spectral radiance of the object to be observed plotted against wavelength or the values of representative wavelength that correspond to maximum values of the spectral radiance of the object to be observed plotted against wavelength are determined, the relationship between wavelength and spectral radiance of the background is obtained while the object to be observed and the background are illuminated by the first light source, and the value of comparative wavelength that corresponds to a maximum value or a minimum value of the spectral radiance of the background plotted against wavelength or the values of comparative wavelength that correspond to maximum values or minimum values of the spectral radiance of the background plotted against wavelength are determined, and the object to be observed and the background are illuminated with light of the value or values of representative wavelength and light of the value or values of comparative wavelength. Accordingly, the value or values of comparative wavelength for the value or values of representative wavelength can be determined so as to increase the contrast ratio between the object to be observed and the background. Thus, the visibility of objects to be observed can be increased without the help of individual observers' personal views and trial and error.

In the method for illumination according to a first embodiment of the second aspect of the present invention, a disabled zone of representative wavelength and of comparative wavelength is determined before the value or values of representative wavelength and the value or values of comparative wavelength are obtained, and the value or values of representative wavelength and the value or values of comparative wavelength are determined such that the value or values of representative wavelength and the value or values of comparative wavelength are outside the disabled zone.

In the method for illumination according to the present embodiment, the value or values of representative wavelength and the value or values of comparative wavelength can be more easily determined by determining the disabled zone. Further, observers' tastes can be reflected by determining the disabled zone A system for determining a spectral distribution of light for illumination according to a third aspect of the present invention includes: a first light source that emits light that has an average color rendering index of 40 or greater, a color temperature in the range from 3000 K to 10000 K and a continuous spectrum in the wavelength range from 380 nanometers and 780 nanometers; a spectral radiance meter; and a processor connected to the spectral radiance meter. The system is configured such that a value or values of representative wavelength and a value or values of comparative wavelength are determined according to the method according to the first or the second aspect of the present invention.

According to the system for determining a spectral distribution of light for illumination according to the present aspect, light for illumination can be determined such that the contrast ratio between the object to be observed and the background is increased.

An illuminating system according to a fourth aspect of the present invention includes the system for determining a spectral distribution of light for illumination according to the third aspect of the present invention and a second light source for illumination with the determined light for illumination.

According to the illuminating system according to the present aspect, the visibility of the object to be observed can be increased without the help of individual observers' personal views and trial and error.

In the illuminating system according to a first embodiment of the fourth aspect of the present invention, the second light source comprises the first light source and plural filters.

By the use of the first light source, the illuminating system can be simplified.

DESCRIPTION OF EMBODIMENTS

Figure 1:
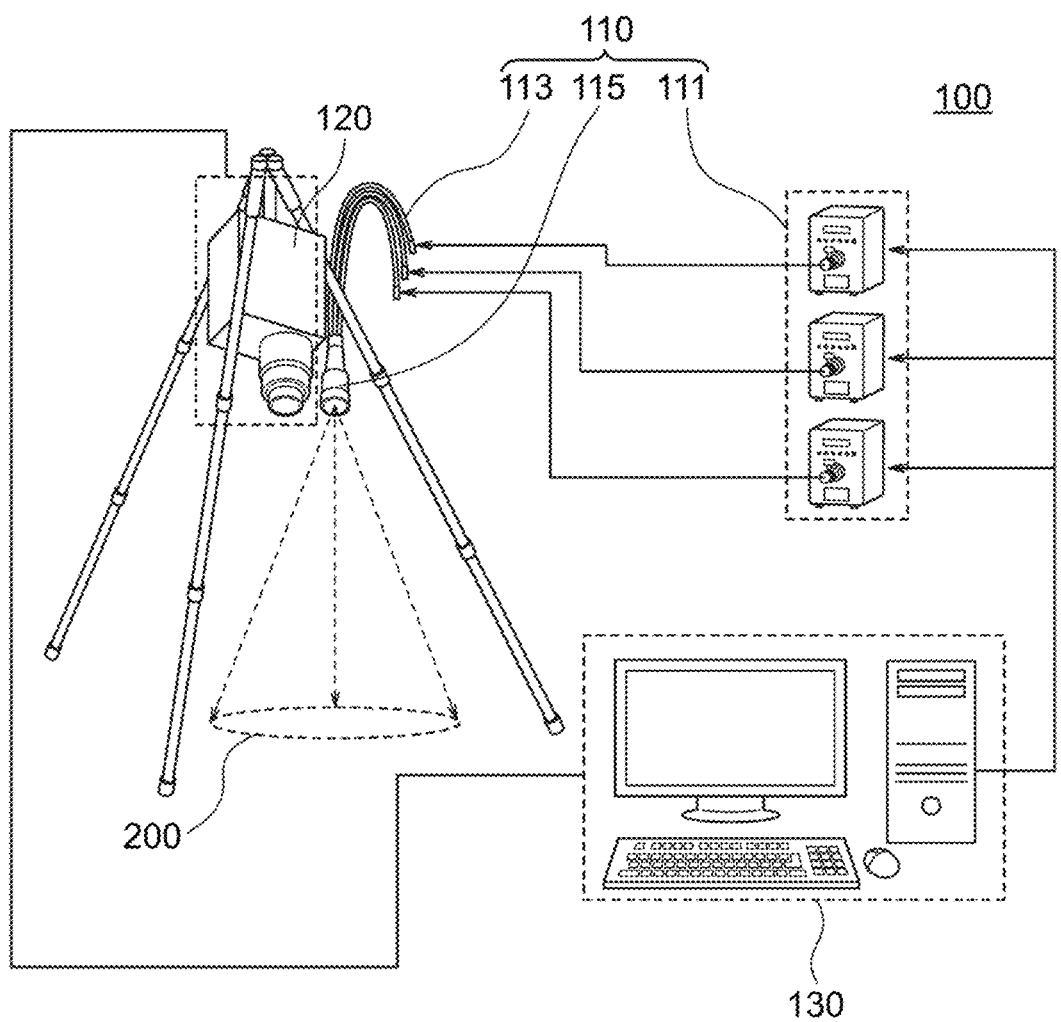
FIG. 1 shows a configuration of an illuminating system 100 used for an illuminating method according to the present invention.

FIG. 1 shows a configuration of an illuminating system 100 used to carry out an illuminating method according to the present invention. The illuminating system 100 includes a light source subsystem 110, a two-dimensional spectral radiance meter 120 and a processor 130. The light source subsystem 110 includes plural light sources 111 used with replaceable filters, light guides 113 and a projector 115. Light for illumination with desired wavelengths is generated by the plural light sources 111 used with replaceable filters and transmitted via the light guides 113 to the projector 115, which illuminates an object 200 with the light for illumination. In general, a light source that emits light having the following features should be employed. The light has an average color rendering index (Ra) of 40 or greater, a color temperature in the range from 3000 K to 10000 K and a continuous spectrum in the wavelength range from 380 nanometers and 780 nanometers. A light source having the above-described features is referred to as a first light source. The first light source can be, for example, a xenon lamp, a metal halide lamp, a mercury lamp, a halogen lamp, a white LED (light-emitting diode) and the like. Each of the plural light sources 111 used with replaceable filters is a combination of the first light source and one of the replaceable filters. By way of example, each of the plural filters is designed to transmit light at a specific wavelength value, and the specific values are in 10-nanometer intervals. Thus, by appropriately selecting filters of the plural light sources 111 used with replaceable filters, the light source subsystem 110 functions as a variable spectrum light source. The object 200 is an object to be observed and the background. The two-dimensional spectral radiance meter 120 measures the spectral radiance of the object 200 under the predetermined conditions described later. The measured spectral radiance data of the object 200 are sent to the processor 130, and light for illumination that emphasizes the contrast between the object to be observed and the background and that increases the visibility for an observer is determined by the processor 130. The light for illumination thus determined is realized by the plural light sources 111 used with replaceable filters. A light source for the light for illumination for increasing the visibility thus realized is referred to as a second light source. In general, the second light source may be a light source separate from the first light source other than a combination of the first light source and filters.

A system for determining a spectral distribution of light for illumination according to the present invention is used to determine the second light source and includes the first light source, the spectral radiance meter 120 and the processor 130. The illuminating system 100 is a combination of the system for determining a spectral distribution of light for illumination described above and the second light source described above.

In the description given below, a xenon lamp is used as the first light source.

Figure 2:
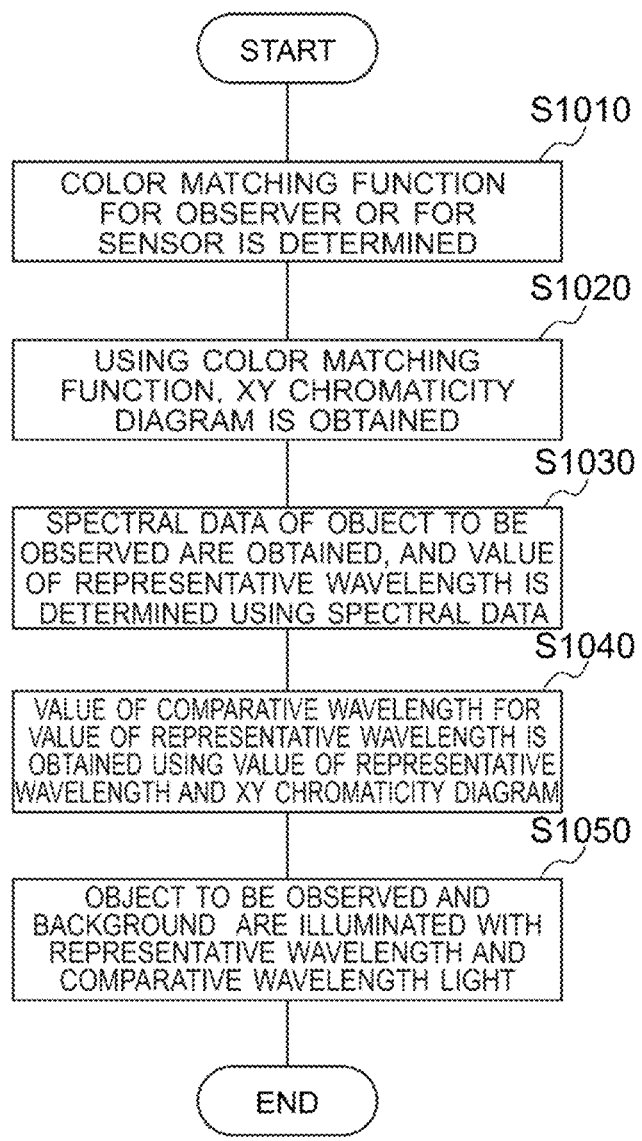
FIG. 2 is a flowchart for describing the method for illumination according to the first aspect of the present invention.

FIG. 2 is a flowchart for describing the method for illumination according to the first aspect of the present invention.

In step S1010 of FIG. 2, a color matching function for an observer or that for a color sensor of a camera of a machine vision system and the like is determined.

First, how to determine a color matching function for an observer will be described. Although individual differences in perception of color among observers can be ignored for white light such as sunlight and light of white LEDs, individual differences in perception of color among observers cannot be ignored for light for illumination the color of which has been adjusted by metamerism. Accordingly, it is desirable that a color matching function is determined for an individual observer to increase the visibility unique to the individual observer. However, when the visibility unique to an individual observer can be ignored, and the visibility of an average observer should be increased by emphasizing the contrast between an object to be observed and the background, the present step can be omitted, and a standard color matching function can be employed.

Next, how to determine a color matching function for a color sensor of a camera will be described. Since a color matching function for a color sensor of a camera is not available, a color matching function for a color sensor of a camera must be prepared.

A color matching function is determined by a color matching experiment. For the color matching experiment, a light source for generating light of a single wavelength and a light source for generating light of a combination of RGB lights of reference color stimuli are prepared. As the above-described two light sources, the two sets of light source subsystems 110 can be employed. Two adjacent areas of a white screen is separately illuminated with light of a single wavelength and light of a combination of RGB lights of reference color stimuli respectively by each of the two light sources described above, and the intensity of radiation of each of the RGB lights is adjusted using image data taken by the camera such that colors of the two areas described above are regarded as identical with each other. Thus, values of metamerism for each wavelength are determined, and the color matching function is defined.

In step S1020 of FIG. 2, using the color matching function obtained in step S1010 or a standard color matching function, an xy chromaticity diagram is obtained. When tristimulus values are represented by X, Y and Z, values of chromaticity (x, y) can be expressed by the following expressions.

$$x = \frac{X}{X+Y+Z}, y = \frac{Y}{X+Y+Z}$$

Values of x and y are obtained by substituting values of the color matching function for each wavelength into the tristimulus values of the expressions described above to determine the xy chromaticity diagram.

Figure 3:
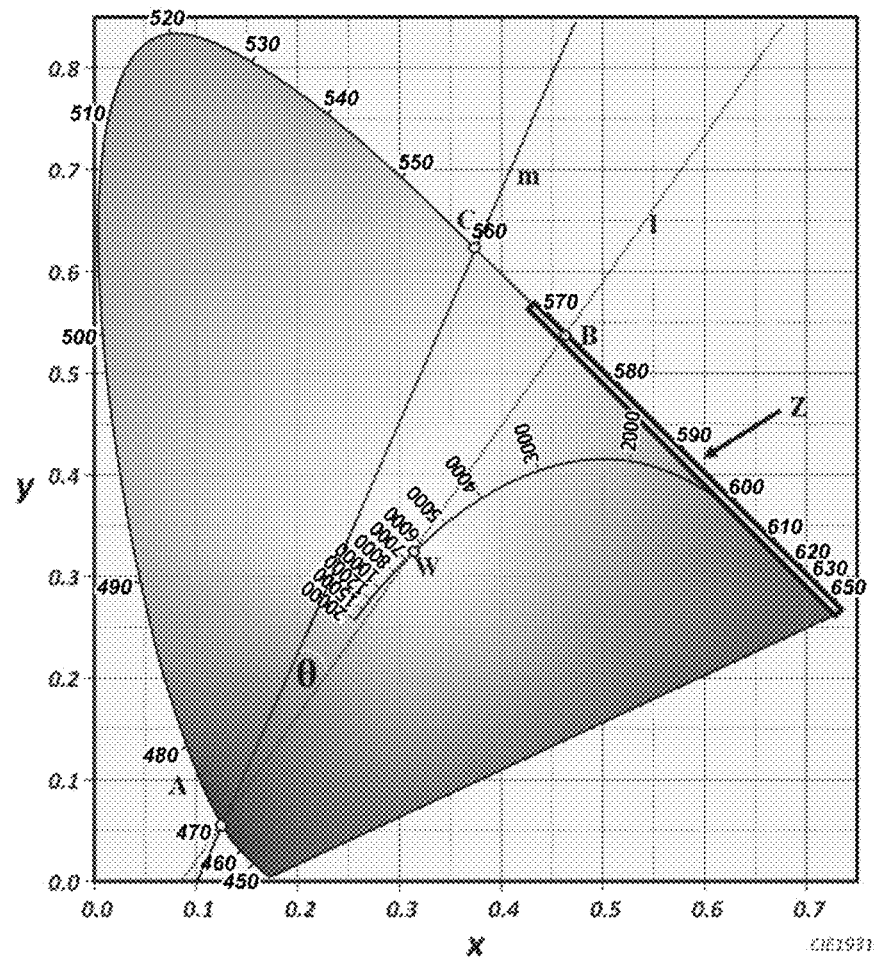
FIG. 3 shows the xy chromaticity diagram determined using the color matching function.

FIG. 3 shows the xy chromaticity diagram determined using the color matching function. How to use the xy chromaticity diagram will be described later.

In step S1030 of FIG. 2, spectral data (spectral radiance data) of an object to be observed are obtained, and the value or values of representative wavelength are determined using the spectral data.

The spectral data (spectral radiance data) of the object to be observed are obtained in a state where the object to be observed and the background are illuminated by a xenon lamp without a filter (the first light source).

Figure 4:
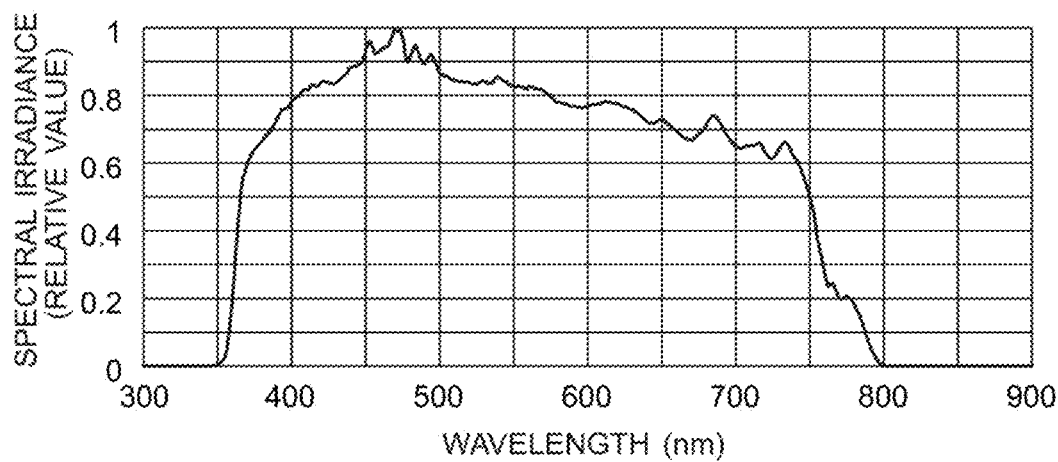
FIG. 4 shows relative values of spectral irradiance of the xenon lamp without a filter.

FIG. 4 shows relative values of spectral irradiance of the xenon lamp without a filter. The horizontal axis of FIG. 4 indicates wavelength, and the unit of wavelength is nanometer. The vertical axis of FIG. 4 indicates relative values of spectral irradiance.

Figure 5:
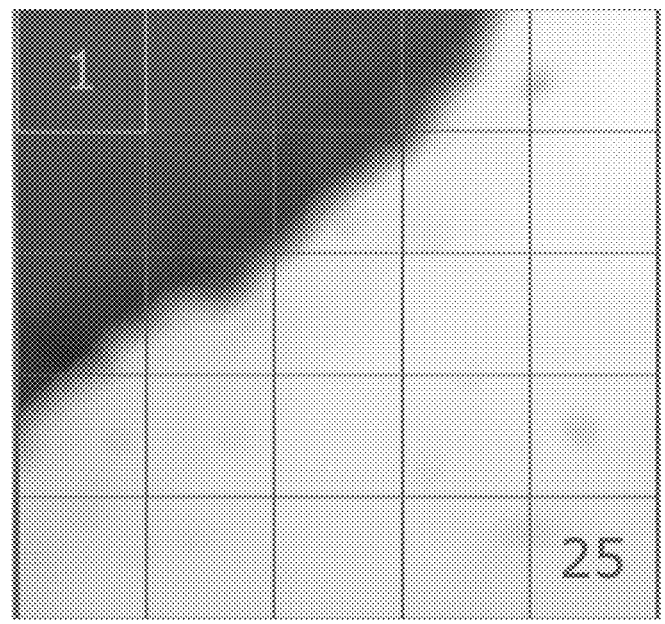
FIG. 5 is an image showing the object to be observed and the background illuminated by the xenon lamp without a filter.

FIG. 5 is an image showing the object to be observed and the background illuminated by the xenon lamp without a filter. The image is divided into 25 sections separated by four horizontal lines and by four vertical lines. In FIG. 5, a dark area including the section numbered 1 is the area of the object to be observed, and a bright area including the section numbered 25 is the area of the background.

Figure 6:
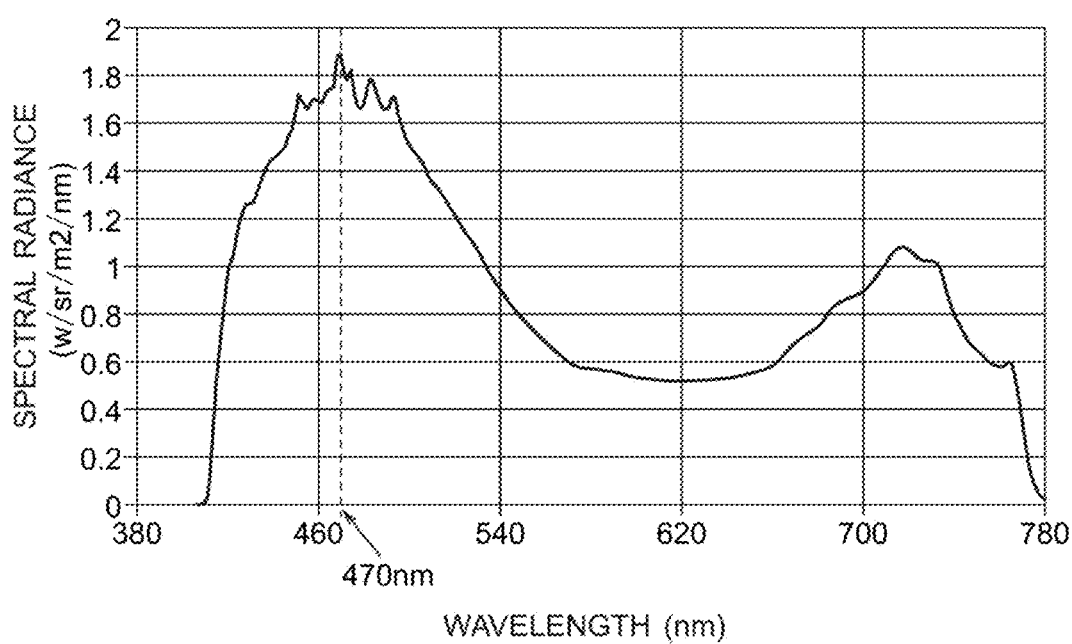
FIG. 6 shows a graph representing the spectral radiance of the section numbered 1 in FIG. 5 in the object to be observed illuminated by the xenon lamp without a filter.

FIG. 6 shows a graph representing the spectral radiance of the section numbered 1 in FIG. 5 in the object to be observed illuminated by the xenon lamp without a filter. The horizontal axis of the graph indicates wavelength, and the unit is nanometer. The vertical axis of the graph indicates radiance, and the unit is watt per steradian per square meter per nanometer.

Using the spectral radiance of the object to be observed shown in FIG. 6, the value of representative wavelength of the object to be observed is determined. The wavelength value corresponding to a maximum value of the spectral radiance can be selected as the value of representative wavelength. The wavelength values corresponding to maximum values of the spectral radiance in FIG. 6 are 470 nanometers and 720 nanometers. Any or both of the two wavelength values can be selected as a value or values of representative wavelength. In the present example, the value of 470 nanometers is selected as the value of representative wavelength.

In step S1040 of FIG. 2, a value of comparative wavelength for the value of representative wavelength is obtained using the value of representative wavelength and the xy chromaticity diagram.

Figure 7:
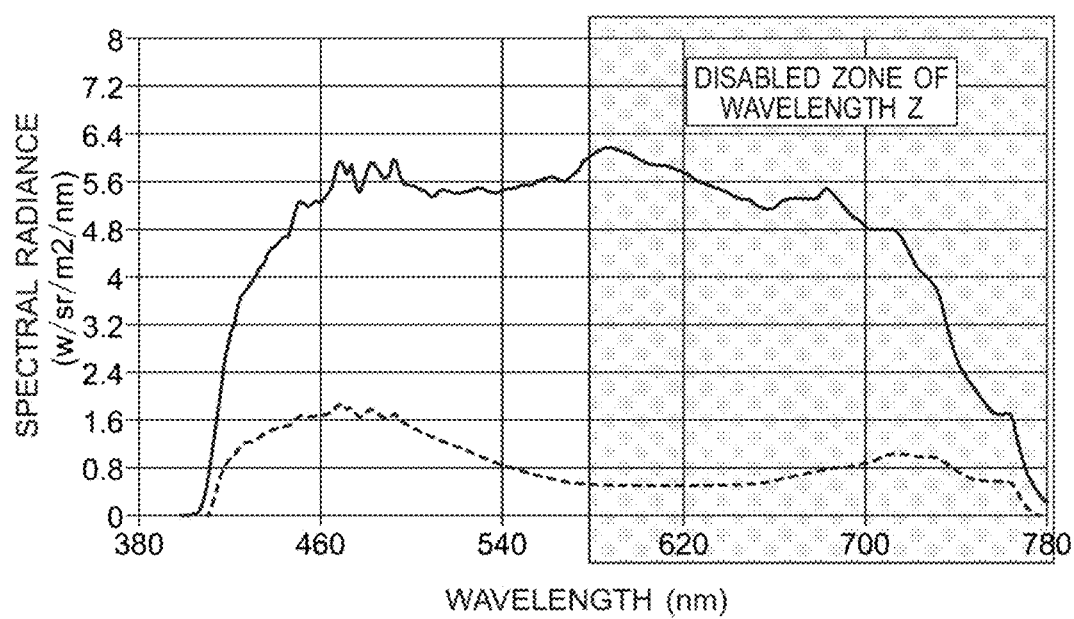
FIG. 7 shows a graph representing the spectral radiance of the section numbered 25 in FIG. 5 in the background illuminated by the xenon lamp without a filter.

FIG. 7 shows a graph representing the spectral radiance of the section numbered 25 in FIG. 5 in the background illuminated by the xenon lamp without a filter. The horizontal axis of the graph indicates wavelength, and the unit is nanometer. The vertical axis of the graph is radiance, and the unit is watt per steradian per square meter per nanometer. In FIG. 7, the solid line in the graph represents the spectral radiance of the section in the background, and the broken line represents the spectral radiance of the section in the object to be observed. The spectral radiance of the section in the object to be observed is identical with what is shown in FIG. 6.

Provided that the background is colorless or of achromatic color (white or gray), a spectral distribution of light for illumination that maximizes the contrast between the object to be observed and the background is determined by a product of light of the value of representative wavelength and light of the complementary wavelength corresponding to the complementary color of the color corresponding to the value of representative wavelength. Accordingly, it would be reasonable to select the complementary wavelength corresponding to the complementary color of the color corresponding to the value of representative wavelength as the value of comparative wavelength for emphasizing the contrast between the object to be observed and the background.

On the other hand, some observers that use the method for illumination may wish to adjust the color of the background. By way of example, when the user wishes to reduce redness in the background, the range of wavelength equal to or greater than 570 nanometers can be defined as a disabled zone Z of wavelength.

Figure 8:
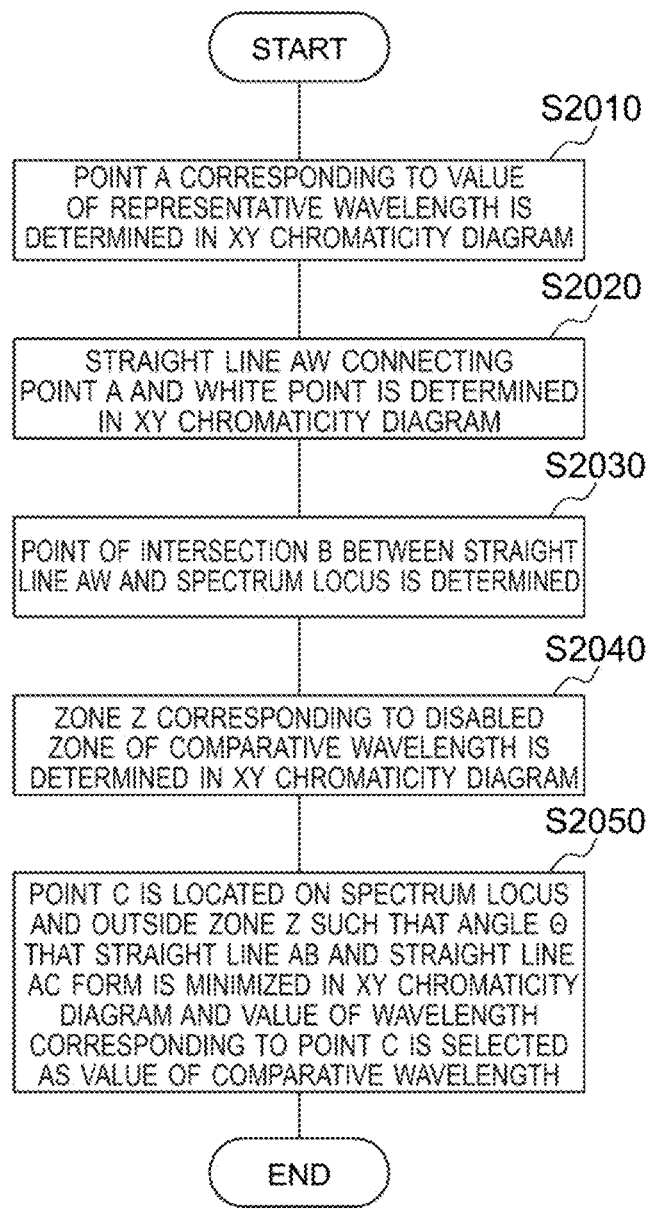
FIG. 8 is a flowchart for describing step S1040 of FIG. 2.

FIG. 8 is a flowchart for describing step S1040 of FIG. 2.

In step S2010 of FIG. 8, the point A corresponding to the value of 470 nanometers of representative wavelength on a spectrum locus is determined in the xy chromaticity diagram shown in FIG. 3. The spectrum locus is the curve forming the outer periphery of the xy chromaticity diagram.

In step S2020 of FIG. 8, the straight line AW connecting the point A and the white point W is determined in the xy chromaticity diagram shown in FIG. 3.

In step S2030 of FIG. 8, the point of intersection B between the straight line AW and the spectrum locus is determined. The point B is the point corresponding to the complementary color of the color corresponding to the value of representative wavelength. Further, the point B is located at the position where the color difference from the point A corresponding to the value of 470 nanometers of representative wavelength is maximized.

In step S2040 of FIG. 8, a zone Z corresponding to a disabled zone of comparative wavelength is determined in the xy chromaticity diagram shown in FIG. 3.

In step S2050 of FIG. 8, a point C is located on the spectrum locus and outside the zone Z such that an angle θ that the straight line AB and the straight line AC form is minimized in the xy chromaticity diagram shown in FIG. 3. Then the wavelength value corresponding to the point C is selected as the value of comparative wavelength. The wavelength value corresponding to the point C is not in the disabled zone Z of wavelength and is closest to the complementary wavelength of the value of representative wavelength. In this example, the target wavelength values of the filters are in 10-nanometer intervals, and the value of representative wavelength is set at 560 nanometers.

Further, when steps S2010-S2050 are carried out, the spectrum locus can be expressed by implicit function curve fitting.

In step S1050 of FIG. 2, the object to be observed and the background are illuminated by the second light source by which light of the value of representative wavelength (470 nanometers) and light of the value of comparative wavelength (560 nanometers) are combined.

Figure 9:
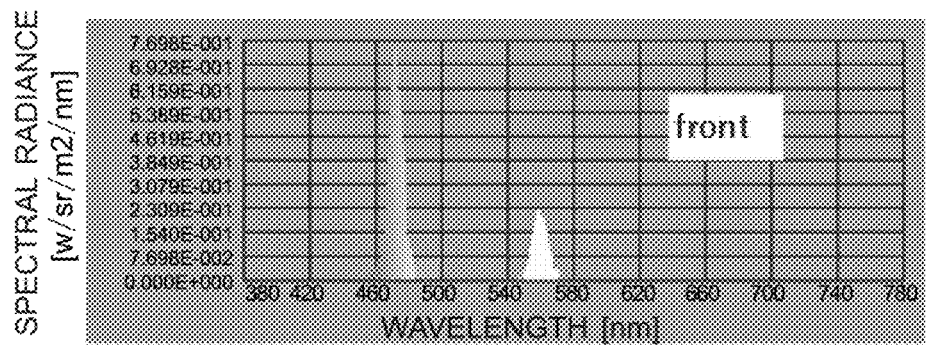
FIG. 9 shows a graph representing the spectral radiance of the section numbered 1 in FIG. 5 in the object to be observed illuminated with light of the value of representative wavelength (470 nanometers) and light of the value of comparative wavelength (560 nanometers)

FIG. 9 shows a graph representing the spectral radiance of the section numbered 1 in FIG. 5 in the object to be observed illuminated with light of the value of representative wavelength (470 nanometers) and light of the value of comparative wavelength (560 nanometers). The horizontal axis of the graph of FIG. 9 indicates wavelength, and the unit is nanometer. The vertical axis of FIG. 9 is spectral radiance, and the unit is watt per steradian per square meter per nanometer. The horizontal axis and the vertical axis in each of FIG. 10, FIG. 12 and FIG. 13 described later are similarly defined.

Figure 10:
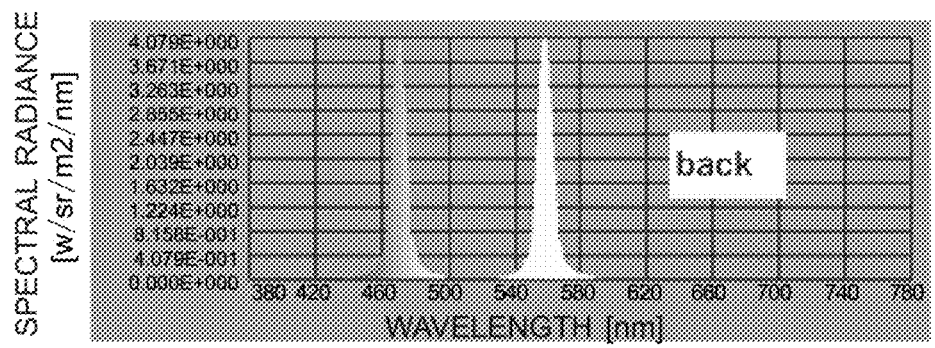
FIG. 10 shows a graph representing the spectral radiance of the section numbered 25 in FIG. 5 in the background illuminated with light of the value of representative wavelength (470 nanometers) and light of the value of comparative wavelength (560 nanometers)

FIG. 10 shows a graph representing the spectral radiance of the section numbered 25 in FIG. 5 in the background illuminated with light of the value of representative wavelength (470 nanometers) and light of the value of comparative wavelength (560 nanometers).

Figure 11:
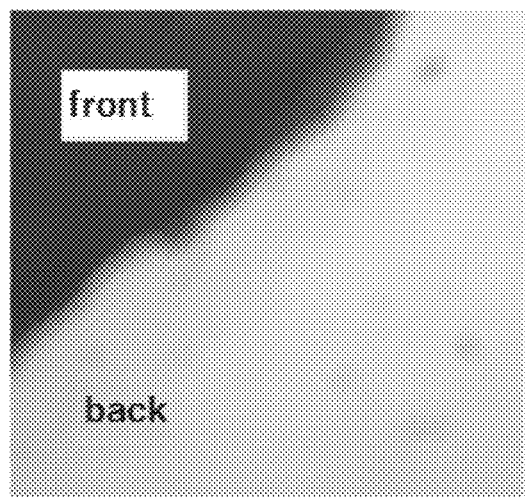
FIG. 11 is an image showing the object to be observed and the background illuminated with light of the value of representative wavelength (470 nanometers) and light of the value of comparative wavelength (560 nanometers)

FIG. 11 is an image showing the object to be observed and the background illuminated with light of the value of representative wavelength (470 nanometers) and light of the value of comparative wavelength (560 nanometers). In FIG. 11, "front" represents the area of the object to be observed, and "back" represents the area of the background.

Figure 12:
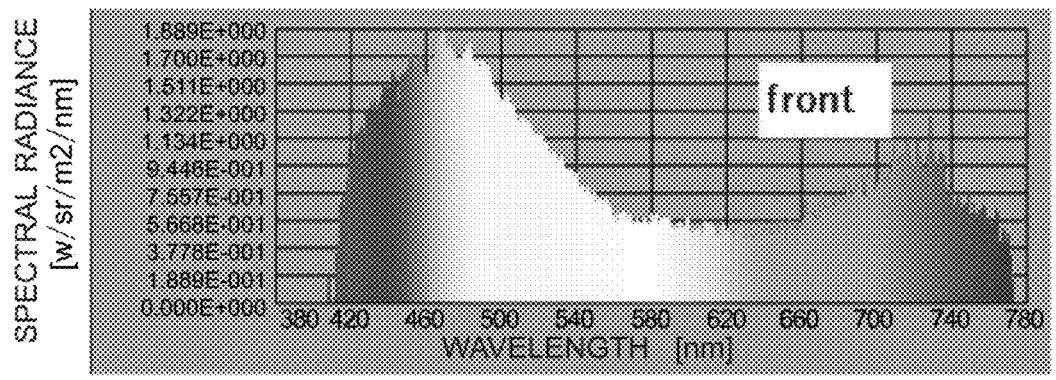
FIG. 12 shows a graph representing the spectral radiance of the section numbered 1 in FIG. 5 in the object to be observed illuminated by the xenon lamp without a filter.

FIG. 12 shows a graph representing the spectral radiance of the section numbered 1 in FIG. 5 in the object to be observed illuminated by the xenon lamp without a filter.

Figure 13:
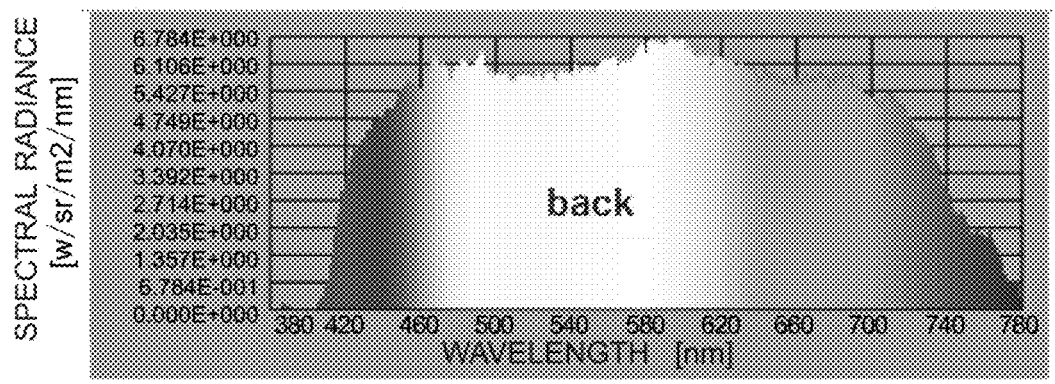
FIG. 13 shows a graph representing the spectral radiance of the section numbered 25 in FIG. 5 in the background illuminated by the xenon lamp without a filter.

FIG. 13 shows a graph representing the spectral radiance of the section numbered 25 in FIG. 5 in the background illuminated by the xenon lamp without a filter.

Figure 14:
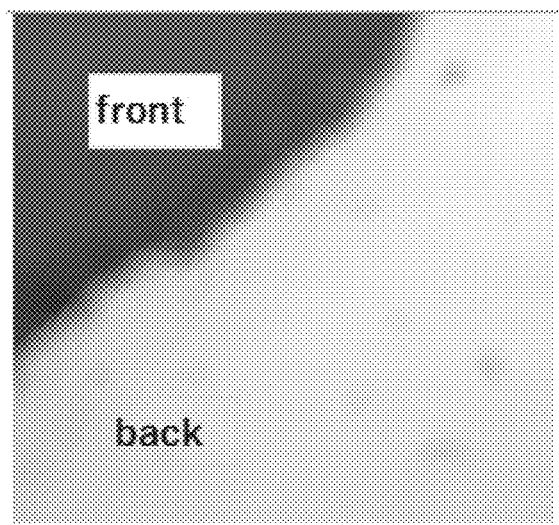
FIG. 14 is an image showing the object to be observed and the background illuminated by the xenon lamp without a filter.

FIG. 14 is an image showing the object to be observed and the background illuminated by the xenon lamp without a filter. In FIG. 14, "front" represents the area of the object to be observed, and "back" represents the area of the background.

The contrast ratio between the object to be observed and the background in the image shown in FIG. 11 and obtained using the method for illumination according to the present invention is greater by 32.8% in comparison with the contrast ratio between the object to be observed and the background in the image shown in FIG. 14 and obtained using a conventional method for illumination. Values of contrast ratio are obtained according to the JIS (Japanese Industrial Standards). Thus, images in which the contrast between the object to be observed and the background is emphasized for a more accurate observation can be provided by the method for illumination according to the present invention.

In general, when an illuminated surface is a uniform reflecting diffuser, spectral radiance of the surface is a product of spectral irradiance onto the surface and spectral reflectance of the surface. Accordingly, the visibility of an object can be increased by determining spectral irradiance in consideration of the spectral reflectance of the object.

As another example, how to obtain a value of comparative wavelength when the value of 720 nanometers corresponding to another maximum value of spectral radiance shown in FIG. 6 is selected as the value of representative wavelength will be described below using the flowchart of FIG. 8.

Figure 15:
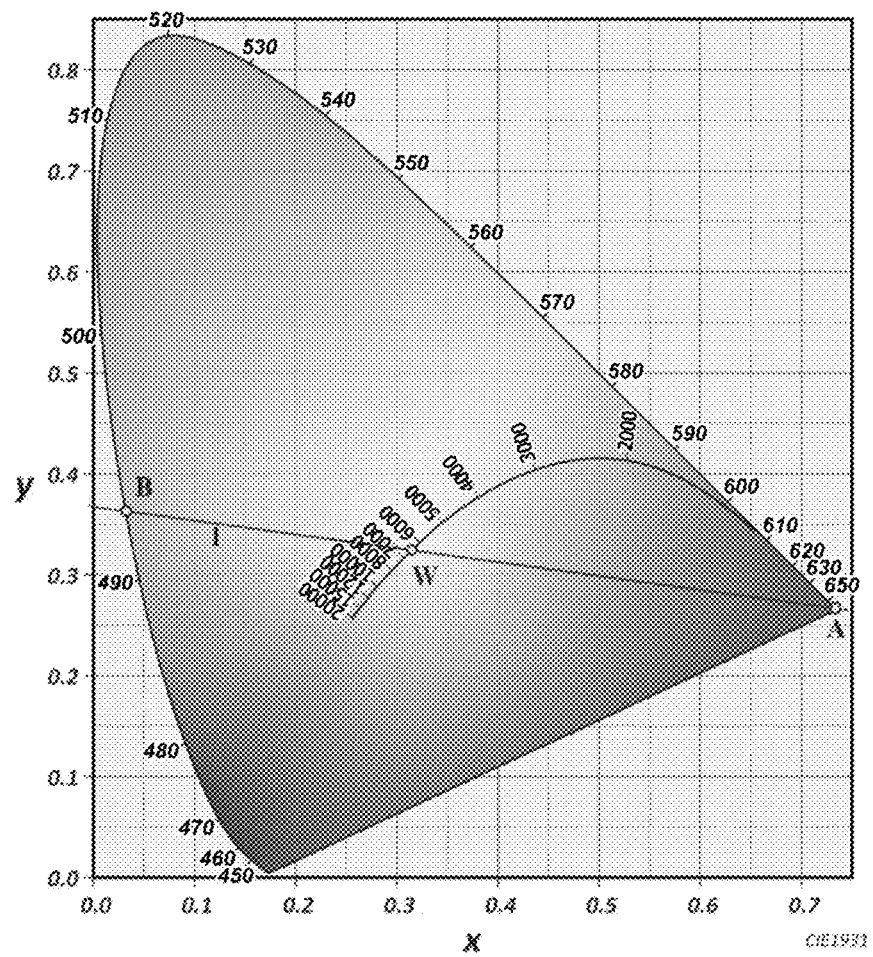
FIG. 15 shows an xy chromaticity diagram determined using a color matching function.

FIG. 15 shows an xy chromaticity diagram determined using a color matching function.

In step S2010 of FIG. 8, the point A corresponding to the value of 720 nanometers of representative wavelength on the spectrum locus is determined in the xy chromaticity diagram shown in FIG. 15.

In step S2020 of FIG. 8, the straight line AW connecting the point A and the white point W is determined in the xy chromaticity diagram.

In step S2030 of FIG. 8, the point of intersection B between the straight line AW and the spectrum locus is determined. The point B is the point corresponding to the complementary wavelength of the value of representative wavelength.

In this example, a zone Z corresponding to a disabled zone of comparative wavelength is not provided, and the wavelength corresponding to the point B is selected as the value of comparative wavelength. The value of comparative wavelength is 490 nanometers.

As still another example, how to obtain a value of comparative wavelength when the wavelength values of 470 nanometers and 720 nanometers corresponding to the two maximum values of spectral radiance shown in FIG. 6 are selected as the values of representative wavelength will be described below.

Figure 16:
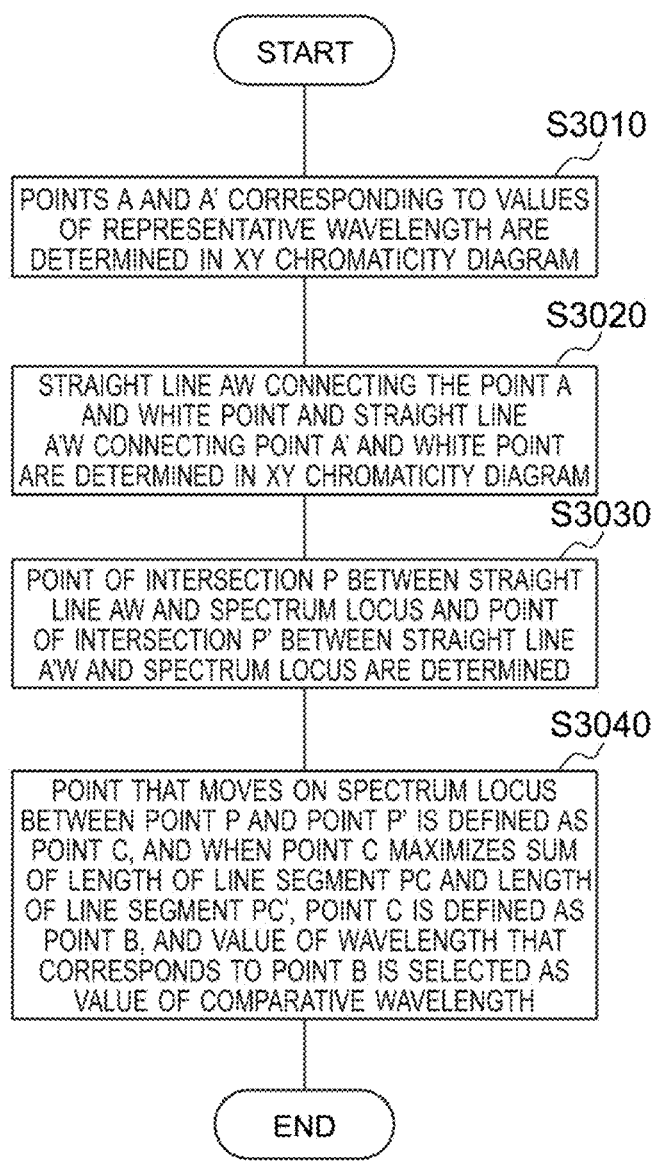
FIG. 16 is a flowchart for describing step S1040 of FIG. 2 when two wavelength values are selected as the values of representative wavelength.

FIG. 16 is a flowchart for describing step S1040 of FIG. 2 when two wavelength values are selected as the values of representative wavelength.

Figure 17:
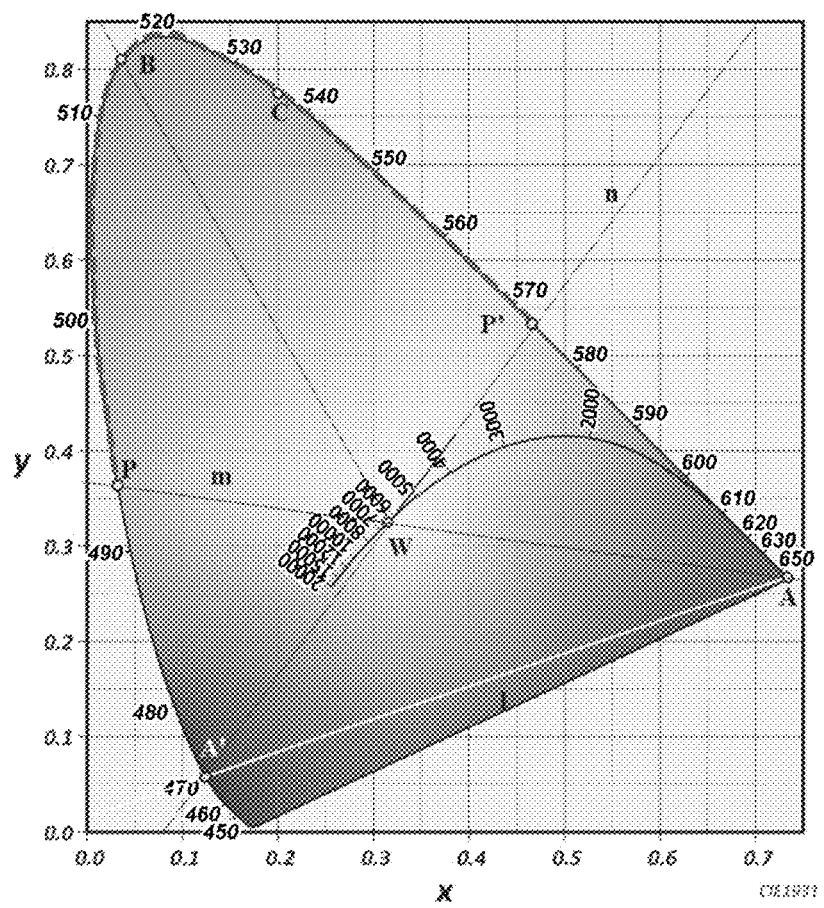
FIG. 17 shows an xy chromaticity diagram determined using a color matching function.

FIG. 17 shows an xy chromaticity diagram determined using a color matching function.

In this example, the segment of the spectrum locus between the two points representing the two wavelength values corresponding to the two maximum values of spectral radiance surrounds the white point in the xy chromaticity diagram shown in FIG. 17. In other words, the angle of view is greater than 180 degrees when the segment of the spectrum locus between the two points representing the two wavelength values is observed from the white point.

In step S3010 of FIG. 16, the point A and the point A' corresponding respectively to the value of 720 nanometers and the value of 470 nanometers of representative wavelength are determined in the xy chromaticity diagram shown in FIG. 17.

In step S3020 of FIG. 16, the straight line AW connecting the point A and the white point W and the straight line A'W connecting the point A' and the white point W are determined in the xy chromaticity diagram shown in FIG. 17.

In step S3030 of FIG. 16, the point of intersection P between the straight line AW and the spectrum locus and the point of intersection P' between the straight line A'W and the spectrum locus are determined in the xy chromaticity diagram. In the segment of the spectrum locus between the point P and the point P' in the xy chromaticity diagram, a point that corresponds to a wavelength value that will increase the visibility for the two wavelength values exists.

In step S3040 of FIG. 16, a point that moves on the spectrum locus between the point P and the point P' in the xy chromaticity diagram shown in FIG. 17 is defined as a point C, and when the point C maximizes the sum of the length of the line segment PC and the length of the line segment PC', the point C is defined as the point B. The wavelength value that corresponds to the point B is selected as the value of comparative wavelength. The wavelength value that corresponds to the point B is 515 nanometers. The point B substantially corresponds to the point at which the sum of the color difference from the point A and the color difference from the point A' is maximized. In this example, the target wavelength values of the filters are in 10-nanometer intervals, and the value of comparative wavelength is set at 520 nanometers.

When three or more wavelength values are selected as the values of representative wavelength, the value of comparative wavelength can be determined in a similar way.

When distances between the plural points on the spectrum locus in the coordinate plane, the points representing plural wavelength values, are 0.1 or smaller, substantially identical results can be obtained even if the average value of the plural wavelength values is selected as the value of comparative wavelength in the flowchart shown in FIG. 8.

An additional example of the method for illumination according to the first aspect of the present invention will be described below.

Figure 18:
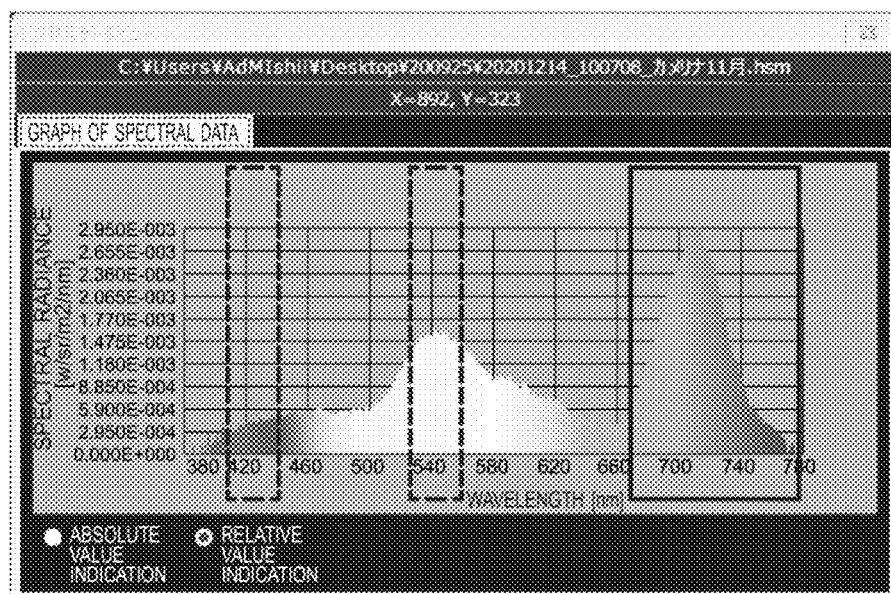
FIG. 18 shows a spectral radiance distribution of an object to be observed illuminated by the first light source.

FIG. 18 shows a spectral radiance distribution of an object to be observed illuminated by the first light source (the xenon lamp without a filter). The horizontal axis of FIG. 18 indicates wavelength, and the vertical axis of FIG. 18 indicates spectral radiance.

In accordance with step S1030 of FIG. 2, from a maximum value of the spectral radiance shown in FIG. 18, the value of 550 nanometers is selected as the value of representative wavelength. Then, in accordance with step S1040 of FIG. 2 and the flowchart of FIG. 8, the value of 430 nanometers is selected as the value of comparative wavelength for the background. Further, the range of wavelength from 670 nanometers to 780 nanometers is defined as a disabled zone of wavelength.

Figure 19:
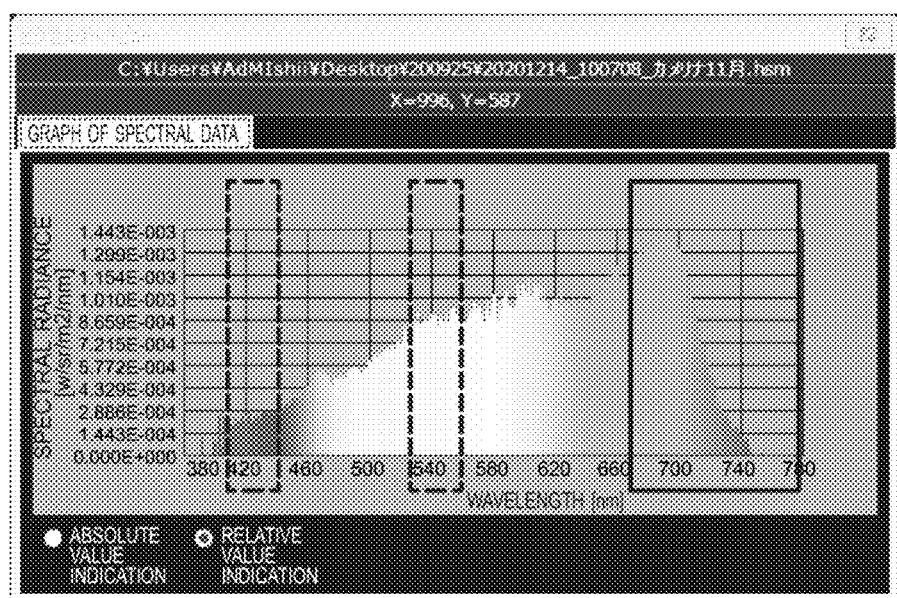
FIG. 19 shows a spectral radiance distribution of the background illuminated by the first light source.

FIG. 19 shows a spectral radiance distribution of the background illuminated by the first light source. The horizontal axis of FIG. 19 indicates wavelength, and the vertical axis of FIG. 19 indicates spectral radiance. The spectral radiance distribution shown in FIG. 19 is not used by the present example and is shown for reference purposes.

The value of representative wavelength, the value of comparative wavelength and the disabled zone of wavelength are shown in FIG. 18 and FIG. 19.

Figure 20:
FIG. 20 shows an image of the object to be observed and the background illuminated by the first light source.

FIG. 20 shows an image of the object to be observed and the background illuminated by the first light source. In this case, the object to be observed is leaves, and the background is the soil.

Figure 21:
FIG. 21 shows an image of the object to be observed and the background illuminated by the second light source that emits the representative wavelength and comparative wavelength light in the additional example of the first aspect of the present invention.

FIG. 21 shows an image of the object to be observed and the background illuminated by the second light source that emits the representative wavelength and comparative wavelength light in the additional example of the first aspect of the present invention. Comparing the image of FIG. 21 with the image of FIG. 20, the contrast between the object to be observed and the background in FIG. 21 is higher than that in FIG. 20.

A method for illumination according to the second aspect of the present invention will be described below.

Figure 22:
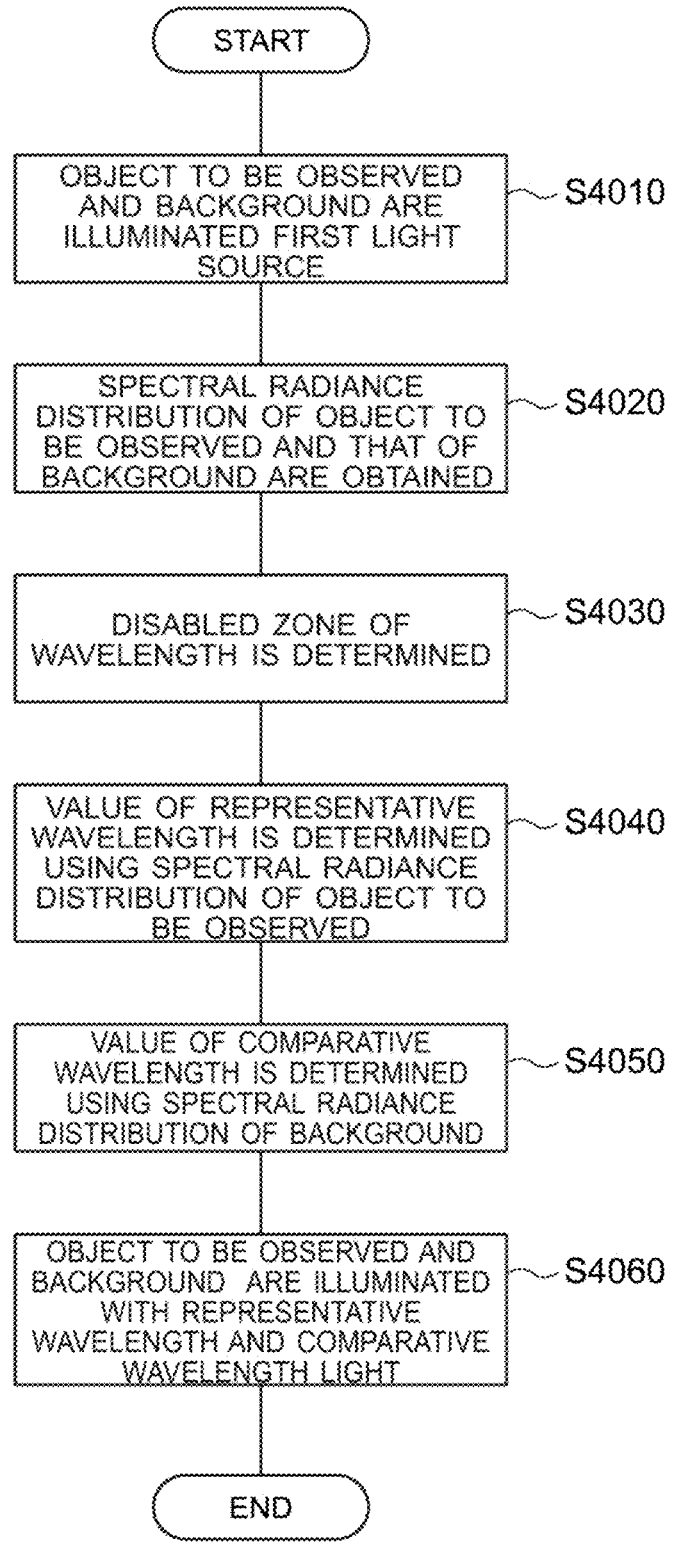
FIG. 22 is a flowchart for describing the method for illumination according to the second aspect of the present invention.

FIG. 22 is a flowchart for describing the method for illumination according to the second aspect of the present invention.

In step S4010 of FIG. 22, the object to be observed and the background are illuminated by the first light source.

In step S4020 of FIG. 22, a spectral radiance distribution of the object to be observed and that of the background are obtained.

In step S4030 of FIG. 22, a disabled zone of wavelength is determined in consideration of the spectral radiance distribution of the object to be observed and that of the background. By way of example, the disabled zone of wavelength can be set to an area where the spectral radiance distribution of the object to be observed and that of the background are similar to each other in shape.

In step S4040 of FIG. 22, the value or values of representative wavelength are determined using the spectral radiance distribution of the object to be observed.

In step S4050 of FIG. 22, the value or values of comparative wavelength are determined using the spectral radiance distribution of the background.

In step S4060 of FIG. 22, the object to be observed and the background are illuminated by the second light source that emits the representative wavelength and comparative wavelength light.

A first example of the method for illumination according to the second aspect of the present invention will be described.

Figure 23:
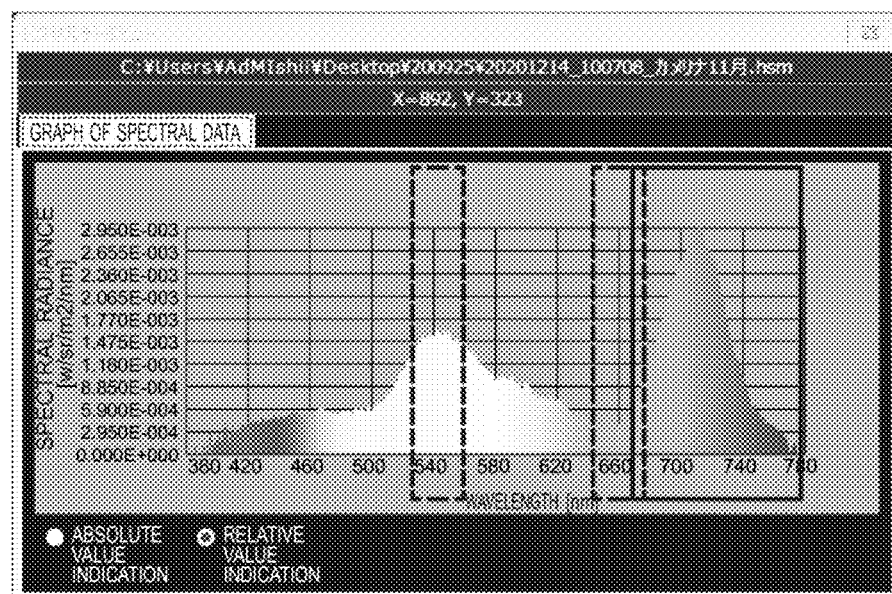
FIG. 23 shows a spectral radiance distribution of an object to be observed illuminated by the first light source.

FIG. 23 shows a spectral radiance distribution of an object to be observed illuminated by the first light source. The horizontal axis of FIG. 23 indicates wavelength, and the vertical axis of FIG. 23 indicates spectral radiance.

Figure 24:
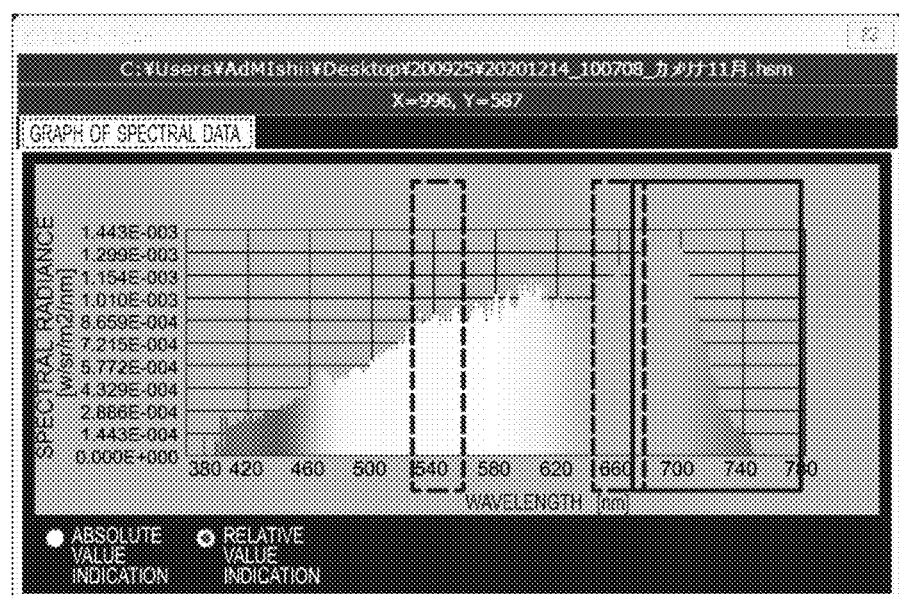
FIG. 24 shows a spectral radiance distribution of the background illuminated by the first light source.

FIG. 24 shows a spectral radiance distribution of the background illuminated by the first light source. The horizontal axis of FIG. 24 indicates wavelength, and the vertical axis of FIG. 24 indicates spectral radiance.

In accordance with step S4030 of FIG. 22, a disabled zone of wavelength is determined in consideration of the spectral radiance distribution of the object to be observed and that of the background. In this example, the range of wavelength from 670 nanometers to 780 nanometers is defined as the disabled zone of wavelength.

In accordance with step S4040 of FIG. 22, the value of representative wavelength is determined using the spectral radiance distribution of the object to be observed. As the value of representative wavelength, the value of 550 nanometers, at which the maximum value of the spectral radiance distribution of the object to be observed is found for wavelength outside the disabled zone of wavelength, was selected. In general, as a value or values of representative wavelength, a part or the whole set of the wavelength values at which maximum values of the spectral radiance distribution of the object to be observed are found can be selected. Alternatively, an average of the part or the whole set of the wavelength values can be selected.

In accordance with step S4050 of FIG. 22, the value of comparative wavelength is obtained using the spectral radiance distribution of the background. As the value of comparative wavelength, the value of 660 nanometers, at which the maximum value of the spectral radiance distribution of the background is found for wavelength outside the disabled zone of wavelength, was selected. In general, as a value or values of comparative wavelength, a part or the whole set of the wavelength values at which maximum values of the spectral radiance distribution of the background are found can be selected. Alternatively, an average of the part or the whole set of the wavelength values can be selected.

The value of representative wavelength, the value of comparative wavelength and the disabled zone of wavelength are shown in FIG. 23 and FIG. 24.

Figure 25:
FIG. 25 shows an image of the object to be observed and the background illuminated by the second light source that emits the representative wavelength and comparative wavelength light in the first example of the second aspect of the present invention.

FIG. 25 shows an image of the object to be observed and the background illuminated by the second light source that emits the representative wavelength and comparative wavelength light in the first example of the second aspect of the present invention. Comparing the image of FIG. 25 with the image of FIG. 20 obtained with illumination by the first light source, the contrast between the object to be observed and the background in FIG. 25 is higher than that in FIG. 20.

A second example of the method for illumination according to the second aspect of the present invention will be described.

Figure 26:
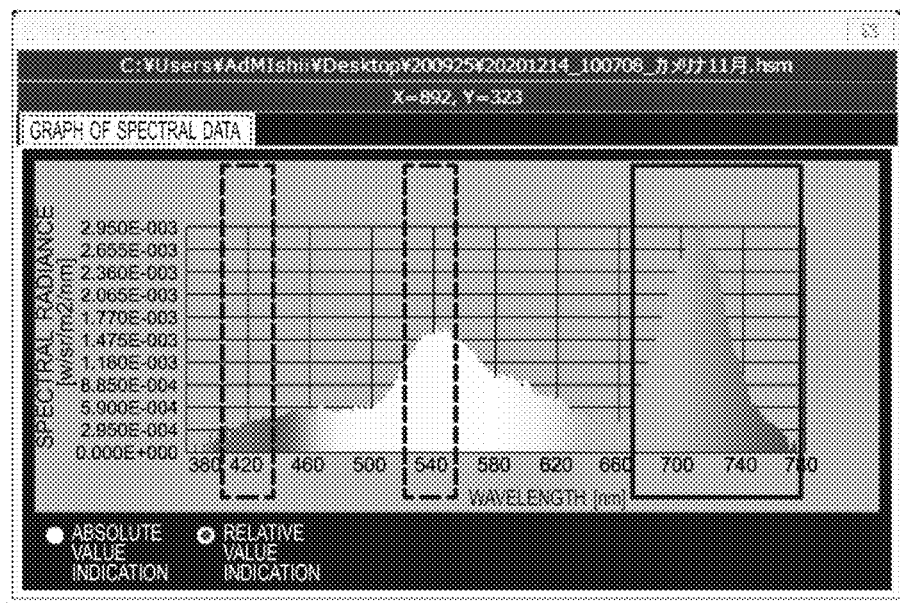
FIG. 26 shows a spectral radiance distribution of an object to be observed illuminated by the first light source.

FIG. 26 shows a spectral radiance distribution of an object to be observed illuminated by the first light source. The horizontal axis of FIG. 26 indicates wavelength, and the vertical axis of FIG. 26 indicates spectral radiance.

Figure 27:
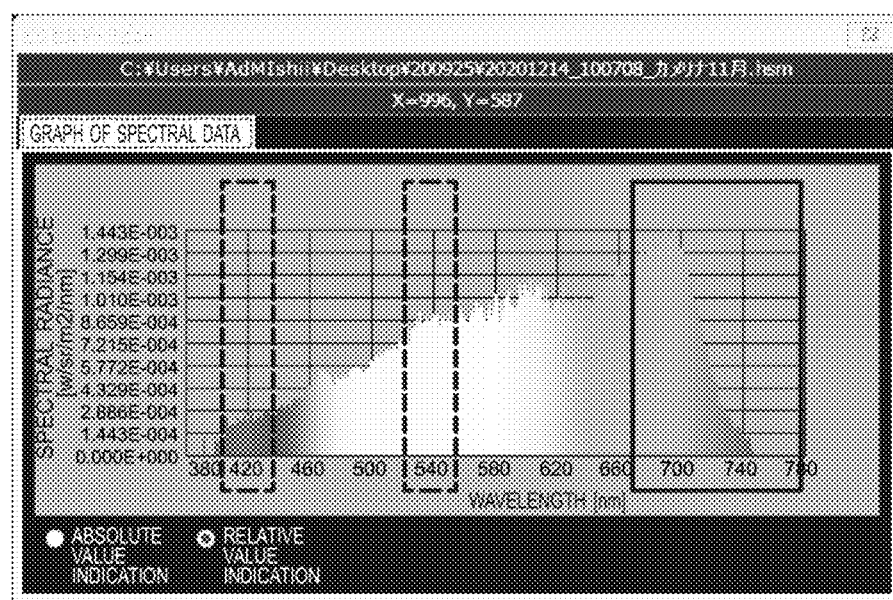
FIG. 27 shows a spectral radiance distribution of the background illuminated by the first light source.

FIG. 27 shows a spectral radiance distribution of the background illuminated by the first light source. The horizontal axis of FIG. 27 indicates wavelength, and the vertical axis of FIG. 27 indicates spectral radiance.

In accordance with step S4030 of FIG. 22, a disabled zone of wavelength is determined in consideration of the spectral radiance distribution of the object to be observed and that of the background. In this example, the range of wavelength from 670 nanometers to 780 nanometers is defined as the disabled zone of wavelength.

In accordance with step S4040 of FIG. 22, the value of representative wavelength is determined using the spectral radiance distribution of the object to be observed. As the value of representative wavelength, the value of 550 nanometers, at which the maximum value of the spectral radiance distribution of the object to be observed is found for wavelength outside the disabled zone of wavelength, was selected. In general, as a value or values of representative wavelength, a part or the whole set of the wavelength values at which maximum values of the spectral radiance distribution of the object to be observed are found can be selected. Alternatively, an average of the part or the whole set of the wavelength values can be selected.

In accordance with step S4050 of FIG. 22, the value of comparative wavelength is determined using the spectral radiance distribution of the background. As the value of comparative wavelength, the value of 430 nanometers, at which the minimum value of the spectral radiance distribution is found for wavelength outside the disabled zone of wavelength, was selected. In general, as a value or values of comparative wavelength, a part or the whole set of the wavelength values at which minimum values of the spectral radiance distribution of the background are found can be selected. Alternatively, an average of the part or the whole set of the wavelength values can be selected.

The value of representative wavelength, the value of comparative wavelength and the disabled zone of wavelength are shown in FIG. 26 and FIG. 27.

Figure 28:
FIG. 28 shows an image of the object to be observed and the background illuminated by the second light source that emits the representative wavelength and comparative wavelength light in the second example of the second aspect of the present invention.

FIG. 28 shows an image of the object to be observed and the background illuminated by the second light source that emits the representative wavelength and comparative wavelength light in the second example of the second aspect of the present invention. Comparing the image of FIG. 28 with the image of FIG. 20, the colors of the leaves to be observed alone are emphasized against the soil in the background.

A third example of the method for illumination according to the second aspect of the present invention will be described.

Figure 29:
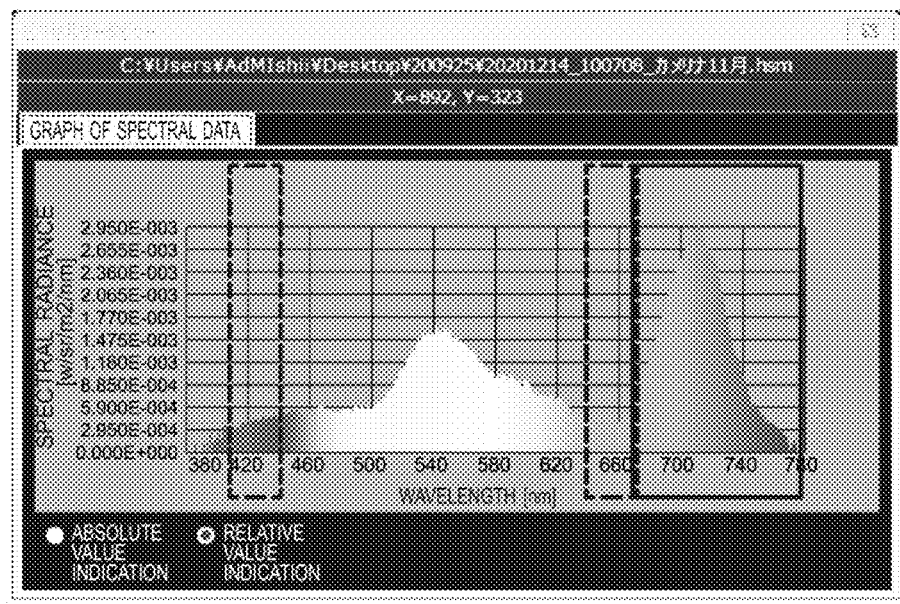
FIG. 29 shows a spectral radiance distribution of an object to be observed illuminated by the first light source.

FIG. 29 shows a spectral radiance distribution of an object to be observed illuminated by the first light source. The horizontal axis of FIG. 29 indicates wavelength, and the vertical axis of FIG. 29 indicates spectral radiance.

Figure 30:
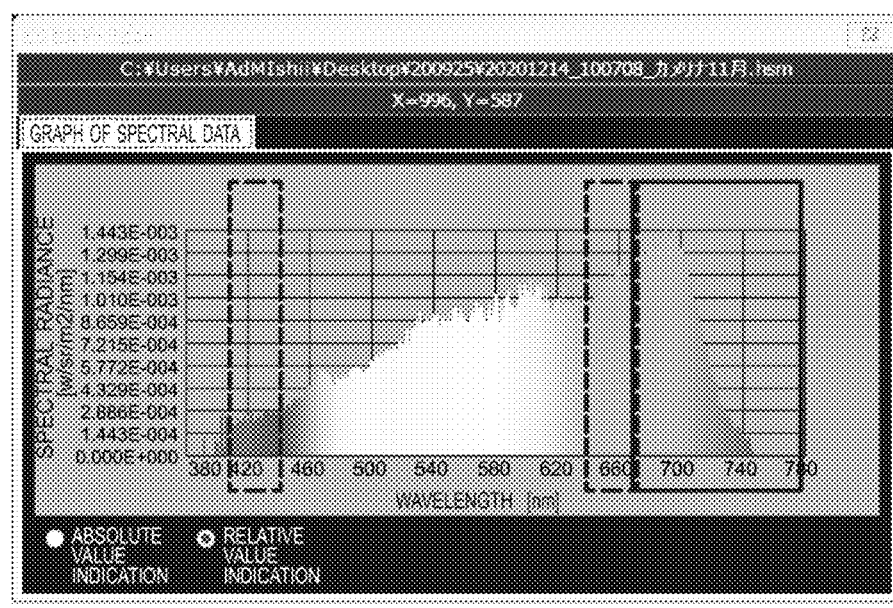
FIG. 30 shows a spectral radiance distribution of the background illuminated by the first light source.

FIG. 30 shows a spectral radiance distribution of the background illuminated by the first light source. The horizontal axis of FIG. 30 indicates wavelength, and the vertical axis of FIG. 30 indicates spectral radiance.

In accordance with step S4030 of FIG. 22, a disabled zone of wavelength is determined in consideration of the spectral radiance distribution of the object to be observed and that of the background. In this example, the range of wavelength from 670 nanometers to 780 nanometers is defined as the disabled zone of wavelength.

In accordance with step S4040 of FIG. 22, the value of representative wavelength is determined using the spectral radiance distribution of the object to be observed. As the value of representative wavelength, the value of 430 nanometers, at which the minimum value of the spectral radiance distribution of the object to be observed is found for wavelength outside the disabled zone of wavelength, was selected. In general, as a value or values of representative wavelength, a part or the whole set of the wavelength values at which minimum values of the spectral radiance distribution of the object to be observed are found can be selected. Alternatively, an average of the part or the whole set of the wavelength values can be selected.

In accordance with step S4050 of FIG. 22, the value of comparative wavelength is obtained using the spectral radiance distribution of the background. As the value of comparative wavelength, the value of 660 nanometers, at which the maximum value of the spectral radiance distribution is found for wavelengths outside the disabled zone of wavelength was selected. In general, as a value or values of comparative wavelength, a part or the whole set of the wavelength values at which maximum values of the spectral radiance distribution of the background are found can be selected. Alternatively, an average of the part or the whole set of the wavelength values can be selected.

The value of representative wavelength, the value of comparative wavelength and the disabled zone of wavelength are shown in FIG. 29 and FIG. 30.

Figure 31:
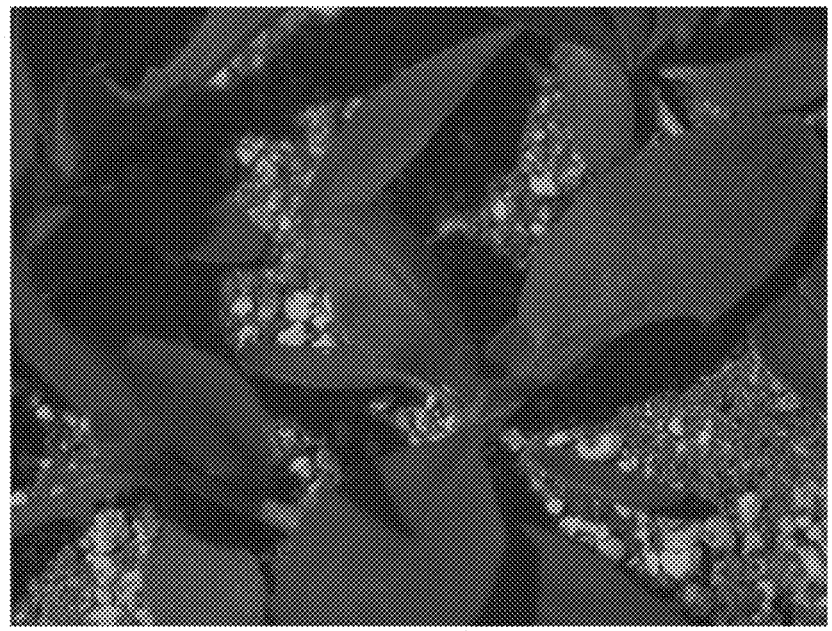
FIG. 31 shows an image of the object to be observed and the background illuminated by the second light source that emits the representative wavelength and comparative wavelength light in the third example of the second aspect of the present invention.

FIG. 31 shows an image of the object to be observed and the background illuminated by the second light source that emits the representative wavelength and comparative wavelength light in the third example of the second aspect of the present invention. Comparing the image of FIG. 31 with the image of FIG. 20, colors of the soil in the background alone are emphasized against the leaves to be observed.

In the third example, the soil is treated just as leaves in the second example in which leaves are "the object to be observed", and leaves are treated just as the soil in the second example in which the soil is "the background". Accordingly, if the soil is regarded as "the object to be observed" and leaves are regarded as "the background" in the third example, the method of the third example is identical with the method of the second example.

A method for illumination can be selected from those of the embodiments described above according to features of spectral radiance distributions of an object to be observed, those of the background and purposes of observation. The most desirable method for illumination can be determined after several methods for illumination of the embodiments have been carried out.

What is claimed is:

1. A method for illumination of an object to be observed and the background, the method comprising the steps of:
   determining a color matching function and obtaining an xy chromaticity diagram using the color matching function;
   obtaining a relationship between wavelength and spectral radiance of the object to be observed while the object to be observed and the background are illuminated by a first light source that emits light that has an average color rendering index of 40 or greater, a color temperature in the range from 3000 K to 10000 K and a continuous spectrum in the wavelength range from 380 nanometers and 780 nanometers, and determining a value of representative wavelength that corresponds to a maximum value of the spectral radiance of the object to be observed plotted against wavelength or values of representative wavelength that correspond to maximum values of the spectral radiance of the object to be observed plotted against wavelength;
   determining a value of comparative wavelength for the value or values of representative wavelength using the value or values of representative wavelength and the xy chromaticity diagram so as to increase a contrast ratio between the object to be observed and the background; and
   illuminating the object to be observed and the background with light of the value or values of representative wavelength and light of the value of comparative wavelength.

2. The method for illumination according to claim 1, wherein a disabled zone of comparative wavelength is determined before the value of comparative wavelength is obtained, and the value of comparative wavelength is determined such that the value is outside the disabled zone.

3. The method for illumination according to claim 1, wherein in the step of determining the value of comparative wavelength, a single value of representative wavelength is used, and the wavelength closest to the complementary wavelength of the single value of representative wavelength in the xy chromaticity diagram is selected as the value of comparative wavelength.

4. The method for illumination according to claim 1, wherein in the step of determining the value of comparative wavelength, plural values of representative wavelength are used, and the wavelength corresponding to the point at which a sum of color differences from the plural points representing the plural values of representative wavelength is maximized in the xy chromaticity diagram, is selected as the value of comparative wavelength.

5. The method for illumination according to claim 1, wherein in the step of determining the value of comparative wavelength, plural values of representative wavelength are used, and the wavelength closest to the complementary wavelength of the average of the plural values of representative wavelength in the xy chromaticity diagram is selected as the value of comparative wavelength.

6. A system for determining a spectral distribution of light for illumination, the system including:
   a first light source that emits light that has an average color rendering index of 40 or greater, a color temperature in the range from 3000 K to 10000 K and a continuous spectrum in the wavelength range from 380 nanometers and 780 nanometers;
   a spectral radiance meter; and
   a processor connected to the spectral radiance meter,
   wherein the system is configured such that a value or values of representative wavelength and a value or values of comparative wavelength are determined in a method for illumination of an object to be observed and the background, the method comprising the steps of:
   determining a color matching function and obtaining an xy chromaticity diagram using the color matching function;
   obtaining a relationship between wavelength and spectral radiance of the object to be observed while the object to be observed and the background are illuminated by the first light source and determining a value of representative wavelength that corresponds to a maximum value of the spectral radiance of the object to be observed plotted against wavelength or values of representative wavelength that correspond to maximum values of the spectral radiance of the object to be observed plotted against wavelength;
   determining a value of comparative wavelength for the value or values of representative wavelength using the value or values of representative wavelength and the xy chromaticity diagram so as to increase a contrast ratio between the object to be observed and the background; and
   illuminating the object to be observed and the background with light of the value or values of representative wavelength and light of the value of comparative wavelength.

* * * * *